Patented Mar. 5, 1940

2,192,299

UNITED STATES PATENT OFFICE 2,192,299

HALOGEN-2-HYDROXY-4-BUTENES-2 AND THEIR DERIVATIVES AND METHODS OF PRODUCING SAME

Arnold M. Collins, Wilmington, Del., assignor to E. I. du Pont de Nemours & Company, Wilmington, Del., a corporation of Delaware No Drawing. Application August 14, 1936, Serial No. 96,049

26 Claims. (Cl. 260—471)

This invention relates to organic hydroxyl compounds and their esters and to a process for producing the same. More particularly, it relates to halogen containing unsaturated organic hydroxyl compounds and their esters.

It is an object of this invention to prepare halogen-2-hydroxy-4-butenes-2 and their esters, such compounds having the comprehensive formula $CH_3-C(X)=CH-CH_2OR$, where X is halogen and R is hydrogen or an oxygen-containing acid radical. A further object is to prepare homologues of the halogen-2-hydroxy-4-butenes-2 and their esters. A more specific object is to prepare chloro-2-hydroxy-4-butene-2 and its esters. A further object is to react dihalogen-2,4-butenes-2 with aqueous alkali. Another object is to substitute a hydroxyl group on the fourth carbon atom of dihalogen-2,4-butenes-2 for the halogen atom thereon. Still a further object is to esterify halogen-2-hydroxy-4-butenes-2. Other objects will appear hereinafter.

These objects are accomplished by subjecting a dihalogen-2,4-butene-2 or a homologue of a dihalogen-2,4-butene-2 to hydrolyzing conditions such as treatment with steam under pressure or with aqueous alkaline solutions, e. g., with aqueous solutions of alkali metal hydroxides or of salts thereof with weak acids. By this treatment the halogen atom on the fourth carbon atom is replaced by a hydroxyl group. The resulting hydroxyl compounds may be isolated and if it is desirable esterified by reaction with an oxygen-containing acid or ester-forming derivative thereof such as an acid halide or an anhydride.

A preferred modification of the invention involves reacting dichloro-2,4-butene-2 with aqueous alkali, particularly, aqueous solutions of salts of sodium or potassium hydroxides with weak acids such as carbonic, whereby chloro-2-hydroxy-4-butene-2 is formed. A further preferred modification of the invention involves esterifying this chloro-2-hydroxy-4-butene-2 with a carboxylic acid.

The following examples are included only for the purpose of illustrating the invention and, therefore, it is to be understood that they are not to be construed as limiting the scope of the invention.

Example 1.—*Chloro-2-hydroxy-4-butene-2*

An aqueous solution of 212 gm. (2 moles) of sodium carbonate in 500 cc. of water was vigorously agitated with 250 g. (2 moles) of dichloro-2,4-butene-2 at 90° C. for 18 hours. The reaction mixture was subjected to ether extraction and the ethereal solution dried with anhydrous potassium carbonate and fractionated. A 53% yield (113 gm.) of chloro-2-hydroxy-4-butene-2 was obtained. This compound had the following properties: B. P. 56.5° C./9 mm.;

$$d_4^{20}, 1.1120; N_D^{20}, 1.4687$$

Upon analysis it was found to contain 44.92% carbon, 6.79% hydrogen and 33.38% chlorine. The calculated values for a compound of the formula $C_4H_7OCl$ are 45.05% carbon, 6.57% hydrogen and 33.33% chlorine.

Example 2.—*Dinitro-3,5-benzoate of chloro-2-hydroxy-4-butene-2*

This ester was readily obtained by heating 3,5-dinitrobenzoyl chloride with chloro-2-hydroxy-4-butene-2 on a steam bath until fumes of hydrogen chloride ceased to be evolved. The dinitrobenzoate after recrystallization from a mixture of ethanol and water melted at 72–3° C. and was found upon analysis to contain 43.96% carbon and 2.85% hydrogen. The calculated values for a compound of the formula $$C_{11}H_9O_6N_2Cl$$

are 43.92% carbon and 2.99% hydrogen.

Similarly, esters of chloro-2-hydroxy-4-butene-2 with other oxygen-containing acids may be prepared. Examples of such acids are inorganic acids such as sulfuric and organic acids such as sulfonic acids (e. g., benzene sulfonic acid) and carboxylic acids. Esters of the latter type constitute the preferred embodiment of the invention. Examples of carboxylic acids, esters of which with chloro-2-hydroxy-4-butene-2 may be prepared, are formic, acetic, propionic, butyric, isobutyric, palmitic, oleic, crotonic, abietic, stearic, benzoic, phenylacetic, oxalic, succinic, adipic, phthalic, salicyclic, and p-amino-benzoic acids. The acid may be aliphatic, aromatic, heterocyclic, or alicyclic; saturated or unsaturated; monobasic or polybasic; and it may or may not contain such other groups as alcohol, nitro, amino, halogen, alcoholic hydroxyl, phenolic hydroxyl, and the like.

The invention is illustrated in the above specific description by applying it to dichloro-2,4-butene-2 but as has been stated other dihalogen-2,4-butenes-2 may be likewise employed. Similarly homologues of these dihalogenbutenes such as those corresponding to the formula

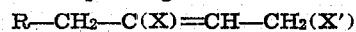

in which X and X' are halogen and R is a hydrocarbon radical and those corresponding to the formula CH₃—C(X)=CR—CH(X')(R') in which X and X' are halogen and R and R' are hydrogen or hydrocarbon radicals but are never both hydrogen may be used. The halogen atoms may be chlorine, bromine or iodine and while preferably the same, they may be different. Specific dihalogenbutenes which may be employed in the present invention are dichloro-2,4-butene-2, dibromo-2,4-butene-2, diiodo-2,4-butene-2, chloro-2-bromo-4-butene-2 and bromo-2-chloro-4-butene-2.

The dihalogenbutenes may be prepared as described in a copending application of Carothers and Collins, Serial No. 688,030, filed September 2, 1933, now matured into U. S. Patent No. 2,102,611. Similarly by the addition of a hydrogen halide to the hydrocarbon substituted monohalogenbutadienes described in Jacobson, U. S. Patent 1,950,440 and Carothers and Coffman, U. S. Patent 1,950,441, it is possible to obtain the homologues of the dihalogenbutenes described above. In general, homologous dihalogenbutenes are formed in the same manner as the dihalogenbutenes themselves, although homologous butadienes do not add the hydrogen halide quite so readily. Further discussion of these inventions will be with particular reference to the dihalogenbutenes themselves but it is to be understood that the same general considerations are applicable to the homologous dihalogenbutenes.

The dihalogenbutene may be reacted with solutions of alkali metal hydroxides, such as those of sodium, potassium, caesium and lithium. Alternatively, it may be reacted with an aqueous solution of alkali metal salt which in aqueous solution gives an alkaline reaction, typical salts of this class being sodium, potassium and ammonium carbonates. A third alternative is to react the dihalogenbutene with steam under pressure. It has been found that the reaction may be conveniently carried out with both reactants dissolved in a common solvent such as dilute alcohol. In any of these cases, the mobile halogen atom (which is the one attached to the end carbon atom) is displaced with the separation of alkali metal halide or hydrogen halide and formation of halogen-2-hydroxy-4-butene-2. Dichlorobutene with solid potassium hydroxide gives monovinylacetylene and perhaps chloro-2-butadiene-1,3.

The reaction time and temperature may be varied within rather wide limits. Thus, the reaction will take place at temperatures between room temperature (about 25° C.) and the boiling point of the mixture, or higher if the reaction is carried out in a closed system. Depending on the other conditions, the reaction time may vary between 3 and 72 hours. Different pairs of reactants may require different times and temperatures, or may have different optimum reaction conditions but such changes are a matter of simple test and will be apparent to those skilled in the art.

In the above example, the full amounts of both reactants used are brought together at once. It is possible, however, to vary this method, for example, by adding the dihalogenbutene dropwise to the aqueous alkali or other hydroxylating means, or vice versa. Preferably, however, the reactants are agitated together. As indicated above, superatmospheric pressures may be employed if desired. Generally, the reactants are brought together in such proportions that the aqueous alkali or other substance to be reacted with the dihalogenbutene is present in considerable excess over the amount required to react with the dihalogenbutene. About 2 equivalents of alkali salt per equivalent of dihalogenbutene has been found satisfactory. Other proportions may be used, however, the amounts of which will be readily apparent to those practicing the invention.

The halogen-2-hydroxy-4-butene-2 formed by the process of this invention may be removed from the reaction mixture in various ways, for example, by extraction of the reaction mixture with ether followed by drying and fractionation of the ethereal solution. After separation of the halogen-2-hydroxy-4-butene-2, it may be further reacted, for example, esterified to yield a wide variety of other compounds. The esters of the halogen-2-hydroxy-4-butenes-2, for example, chloro-2-hydroxy-4-butene-2 may be prepared by any of the known methods, such as by using the acids themselves with or without catalysts, or by using the anhydrides or chlorides of the acids. The esters may be isolated by any desired means depending on their physical properties. Suitable means for isolating any particular ester will be apparent to those skilled in the art and particularly, in view of the diversity of methods which may be employed, need not be discussed further herein.

This invention provides a simple and convenient method for synthesizing halogen-2-hydroxy-4-butenes-2 and their esters, particularly, chloro-2-hydroxy-4-butene-2 and its esters. The starting dihalogenbutenes are readily available derivatives of vinylacetylene. These new compounds would be difficult to prepare by other methods. The halogen-2-hydroxy-4-butenes-2, particularly, the chloro compound, lend themselves readily to various syntheses and their esters are useful as solvents, perfume chemicals and pharmaceuticals.

It is apparent that many widely different embodiments of this invention may be made without departing from the spirit and scope thereof, and, therefore, it is not intended to be limited except as indicated in the appended claims.

I claim:

1. A halogen-2-hydroxy-4-butene-2.
2. Chloro-2-hydroxy-4-butene-2.
3. Bromo-2-hydroxy-4-butene-2.
4. A carboxylic acid ester of chloro-2-hydroxy-4-butene-2.
5. The process which comprises hydrolyzing a dihalogen-2,4-butene-2 to a halogen-2-hydroxy-4-butene-2.
6. The process which comprises hydrolyzing dichloro-2,4-butene-2 to chloro-2-hydroxy-4-butene-2 with steam.
7. The process which comprises hydrolyzing a dihalogen-2,4-butene-2 to a halogen-2-hydroxy-4-butene-2 with aqueous alkali.
8. The process which comprises hydrolyzing dichloro-2,4-butene-2 to chloro-2-hydroxy-4-butene-2 with aqueous alkali.
9. The process which comprises hydrolyzing a dihalogen-2,4-butene-2 to a halogen-2-hydroxy-4-butene-2 with aqueous alkali and separating the halogen-2-hydroxy-4-butene-2 from the reaction mixture.
10. The process which comprises hydrolyzing dichloro-2,4-butene-2 to chloro-2-hydroxy-4-butene-2 with aqueous alkali and separating the chloro-2-hydroxy-4-butene-2 from the reaction mixture.

11. The process of claim 7 further characterized in that an excess of alkali is used.

12. The process of claim 8 further characterized in that an excess of alkali is used.

13. The process which comprises hydrolyzing dichloro-2,4-butene-2 to chloro-2-hydroxy-4-butene-2 with an excess of aqueous alkali at a temperature substantially above room temperature and separating the chloro-2-hydroxy-2-butene-2 from the reaction mixture.

14. The process which comprises hydrolyzing dichloro-2,4-butene-2 to chloro-2-hydroxy-4-butene-2 with an aqueous solution of sodium carbonate by vigorously agitating for 18 hours at 90° C., the two reactants being present in substantially the same molecular proportions, subjecting the reaction mixture to an ether extraction, drying the ethereal solution with anhydrous potassium carbonate and separating the chloro-2-hydroxy-4-butene-2 by fractional distillation.

15. A compound of the group consisting of compounds of the formula

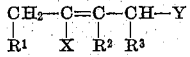

in which X is a halogen atom, Y is a member of the group consisting of hydroxyl and carboxylic acid ester radicals and $R^1$, $R^2$, and $R^3$ are members of the group consisting of hydrogen and hydrocarbon radicals, but when $R^1$ is hydrocarbon, $R^2$ and $R^3$ are hydrogen.

16. A process which comprises hydrolyzing a compound of the formula

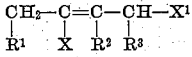

to a compound of the formula

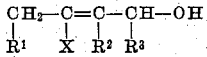

in which formulae X and $X^1$ are halogen atoms and $R^1$, $R^2$ and $R^3$ are members of the group consisting of hydrogen and hydrocarbon radicals, but when $R^1$ is hydrocarbon $R^2$ and $R^3$ are hydrogen.

17. The process which comprises reacting dichloro-2,4-butene-2 with an aqueous solution of sodium carbonate by agitating them together, the two reactants being present in substantially the same molecular proportions, treating the reaction mixture with an organic solvent for chloro-2-hydroxy-4-butene-2 to extract the same, drying the extract and separating chloro-2-hydroxy-4-butene-2 therefrom by distillation.

18. A compound as described in claim 15, further characterized in that $R^1$, $R^2$ and $R^3$ are hydrogen.

19. Dinitro-3,5-benzoate of chloro-2-hydroxy-4-butene-2.

20. The process which comprises hydrolyzing a dihalogen-2,4-butene-2 to a halogen-2-hydroxy-4-butene-2 and then esterifying the hydroxy compounds with a carboxylic acid.

21. A process as described in claim 16, further characterized in that the hydroxy compound formed is then esterified with a carboxylic acid.

22. The process which comprises hydrolyzing dichloro-2,4-butene-2 to chloro-2-hydroxy-4-butene-2 and then esterifying the hydroxy compound with a carboxylic acid.

23. The process which comprises esterifying with a carboxylic acid a compound of the general formula

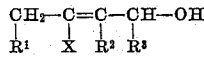

in which X is a halogen atom and $R^1$, $R^2$ and $R^3$ are members of the group consisting of hydrogen and hydrocarbon radicals but when $R^1$ is hydrocarbon $R^2$ and $R^3$ are hydrogen.

24. The process which comprises esterifying a halogen-2-hydroxy-4-butene-2-with a carboxylic acid.

25. The process which comprises esterifying chloro-2-hydroxy-4-butene-2 with a carboxylic acid.

26. The process of forming the dinitro-3,5-benzoate of chloro-2-hydroxy-4-butene-2, which comprises reacting chloro-2-hydroxy-4-butene-2 with 3,5-dinitrobenzoyl chloride.

ARNOLD M. COLLINS.

CERTIFICATE OF CORRECTION.

Patent No. 2,192,299.  March 5, 1940.

ARNOLD M. COLLINS.

It is hereby certified that error appears in the printed specification of the above numbered patent requiring correction as follows: Page 3, first column, line 11, claim 13, for "chloro-2-hydroxy-2-" read chloro-2-hydroxy-4-; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.